United States Patent [19]

Eastcott et al.

[11] Patent Number: 4,496,883
[45] Date of Patent: Jan. 29, 1985

[54] ELECTRIC INCHING IMPULSE CONTROL

[75] Inventors: Peter D. Eastcott; Ronald C. Trussler, both of Peterborough, Canada

[73] Assignee: Canadian General Electric Company Limited, Toronto, Canada

[21] Appl. No.: 556,906

[22] Filed: Dec. 1, 1983

Related U.S. Application Data

[63] Continuation-in-part of Ser. No. 448,316, Dec. 9, 1982, abandoned.

[30] Foreign Application Priority Data

Dec. 10, 1981 [CA] Canada .................................. 391915

[51] Int. Cl.³ ........................... H02P 1/54; H02P 7/74
[52] U.S. Cl. ...................................... 318/98; 318/85; 318/100; 318/443; 318/460
[58] Field of Search ................... 318/443, 444, 98, 99, 318/326, 460, 100, 101, 85, 84, 97, 460, 86

[56] References Cited

U.S. PATENT DOCUMENTS

| | | | |
|---|---|---|---|
| 2,136,907 | 11/1938 | Roder | 318/460 X |
| 2,864,040 | 12/1958 | Trotsky | 318/99 X |
| 3,050,264 | 8/1962 | Marcyes et al. | 318/460 X |
| 3,132,293 | 5/1964 | Marrs | 318/97 X |
| 3,267,345 | 8/1966 | Boening | 318/84 X |
| 3,688,167 | 8/1972 | Ivey et al. | 318/99 X |
| 3,735,217 | 5/1973 | Kilgore et al. | 318/100 |
| 3,742,321 | 6/1973 | Bergman et al. | 318/99 |
| 3,780,364 | 12/1973 | Henderson | 318/326 X |
| 3,991,349 | 11/1976 | Watson et al. | 318/100 X |
| 4,423,360 | 12/1983 | Pasterkamp | 318/85 |

FOREIGN PATENT DOCUMENTS

| | | | |
|---|---|---|---|
| 896082 | 3/1972 | Canada | 318/86 |
| 909857 | 9/1972 | Canada | 318/100 |
| 961956 | 1/1975 | Canada | 318/85 |
| 1420697 | 1/1976 | United Kingdom | 318/98 |
| 591825 | 2/1978 | U.S.S.R. | 318/460 |

OTHER PUBLICATIONS

"Spotting Equipment for Synchronous Motors", Technical Information booklet, General Electric, E. A. E. Rich, Nov., 1966, GET-1722C.

Primary Examiner—J. V. Truhe
Assistant Examiner—Bentsu Ro
Attorney, Agent, or Firm—Raymond A. Eckersley

[57] ABSTRACT

There is provided an electrical inching control for inching a drive system comprising a grinding mill driven by one or more three phase synchronous motors. The electric inching control includes an inching power bus and contactors or the solid state equivalent thereof. The inching bus supplies energy for the stator windings of the synchronous motors. The contactors or switches connect the positive and negative sides of a direct current power supply to the different phases of the stator windings in a sequence which provides a stepped rotating magnetic field, and the rotor field windings are excited with direct current. The interacting stator and rotor fields causes a rotation of the rotor a predetermined amount with each step causing the mill also to rotate a respective predetermined amount. The electric inching control of the present invention further includes a vibration sensor which detects vibration in the gearing driving the mill and the signal from the vibration sensor is applied to a feedback voltage magnitude control which adjusts the magnitude of voltage applied to the stator windings of the synchronous motors reducing the voltage as the signal representing vibration increases to reduce the adverse mechanical forces incurred by the mill.

4 Claims, 1 Drawing Figure

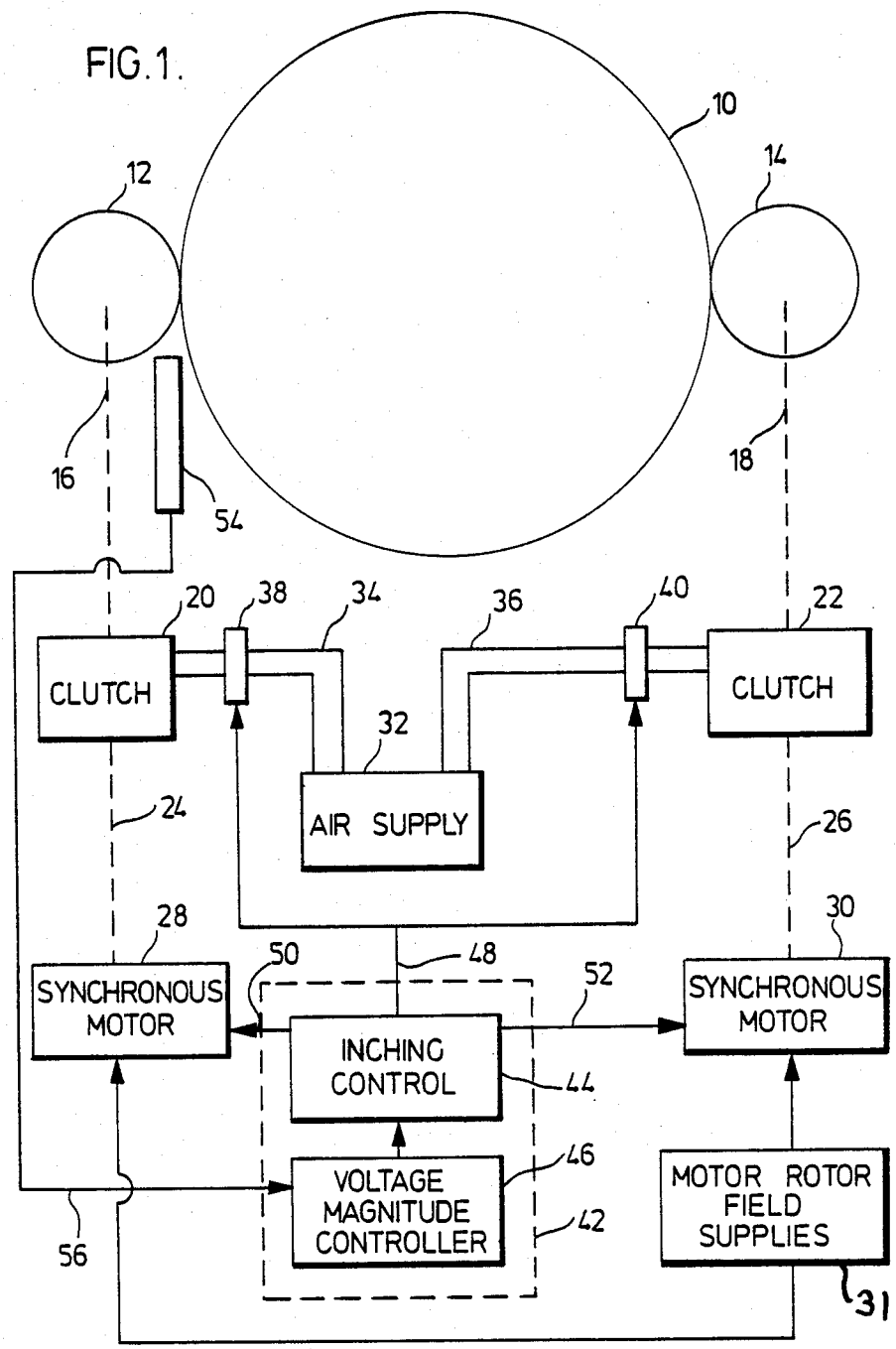

ELECTRIC INCHING IMPULSE CONTROL

CROSS REFERENCE

This is a continuation-in-part of application Ser. No. 448,316 filed Dec. 9, 1982, now abandoned.

BACKGROUND OF THE INVENTION

The present invention relates to a drive system having one or more synchronous motors driving a common load. In particular it relates to an improved electric inching control for synchronous motors driving grinding mills.

Frequently, a charge in a mill becomes frozen as a result of mill shut-down. Therefore, prior to starting the mill, it is common practice to "electrically inch" the mill by gradually rotating the rotors of the synchronous motors so that the mill is moved in steps which allow the mill charge to gradually move and tumble (i.e. to cascade or flow freely); thereby, preventing the lumped charge from falling instantaneously within the mill. In order to ensure that the mill can be inched properly, it is known to fully close the fluid actuated clutches, mechanically coupling the pinions driving the ring gear of the mill and the drive shafts of the synchronous motors. When low frequency power is applied from the inching bus, each pole of the field winding on the rotor (rotor pole) is positioned in alignment with and adjacent to a corresponding stator pole of opposite polarity on the stator winding. It is convenient to provide a rough approximation of low frequency power for the stator windings by using a direct current supply in combination with contactors or switches which apply the positive or negative voltages to predetermined ones of the three phase windings on each stator in a predetermined sequence.

Inching the mill electrically involves rotating the rotor so that each rotor pole, positioned adjacent its corresponding stator pole, is advanced to a position adjacent and in alignment with the next stator pole on the stator winding. The movement of each rotor pole of the two synchronous motor rotors is accomplished by energizing the stator windings with a low frequency alternating current and energizing the field windings of the rotors with direct current. The sequential application of the direct current voltage to the different phases of the three phase stator winding is preferably equivalent to a stator voltage of a frequency of the order of 1 cycle per second. Technical Information Bulletin GET-1722B entitled "Spotting Equipment for Synchronous Motors", E. A. E. Rich, published November 1966 by the General Electric Company, describes the use of two switches or contactors for each phase to connect the phase when required to either the positive or the negative line of a direct current supply, and thereby, by various connections, cause the rotor to rotate (see for example FIGS. 1 and 3 and related description).

A problem inherent in current electrical inching systems for mills presents itself when the rotors of the synchronous motors are slowly rotated, i.e. are stepped from one position to the next. During rotation of the rotors, each rotor pole overshoots when it advances to a position adjacent the next stator pole. The overshooting occurs because of the large momentum provided by the charged load, the mill and the rotors of the synchronous machines. Furthermore, after the rotors overshoot the next stator pole position, the magnetic field generated by the stator winding of each of the motors pulls each rotor pole back into alignment with the corresponding stator pole that has been overshot. Due to the momentum and the magnetic field, the rotor tends to oscillate. The disadvantage with the overshooting and oscillation of the rotor primarily resides in the destructive effect this vibrational movement has on the teeth of the ring gear and the pinions, which teeth mechanically couple the ring gear and the pinions. These teeth are subject to considerable adverse mechanical forces such as, for example, various strains and stresses during the oscillation of the rotor. The continued presence of such adverse forces on the teeth may result in breaking the teeth of either the pinions and/or the ring gear. As can be appreciated, it is expensive in terms of both material cost and mill down time to replace the gear.

SUMMARY OF THE INVENTION

It is therefore an object of the present invention to provide an electric inching control means that reduces the adverse mechanical forces incurred by the mill during inching of the mill.

It is another object of the invention to detect vibration in the region of engagement of the teeth of the ring gear and pinion and provide a signal representing the degree of vibration, and then to use the signal to reduce the magnitude of voltage applied to the stator windings for causing rotation, thereby to reduce the vibration.

Briefly, the present invention provides an electric inching control means for inching a drive system comprising a load driven by one or more three phase synchronous motors coupled to the load through respective fluid actuated clutches or couplings with gearing coupling the clutches and the load. If clutches are used, it is preferable that the synchronous motors be previously synchronized and the clutches locked up before inching begins. A procedure for accomplishing this automatically, is described in commonly assigned co-pending U.S. application Ser. No. 448,338, filed Dec. 9, 1982, inventors Eastcott and Trussler. The inching control means according to the invention comprises actuating means for energizing the synchronous motors including means for applying direct current excitation to the field winding on rotors of the synchronous motors and means for applying direct current voltage to required ones of the three phase in the stator winding of each of the sychronous motors in a predetermined sequence so as to rotate the rotors and the load by respective predetermined amounts upon each successive application of the voltage. The inching control means further includes a voltage magnitude control feedback means which adjusts the magnitude of the voltage applied to the stator windings as a function of vibration caused by adverse mechanical forces in the gearing as the mill rotates. The advantage of the present invention resides in the control of the magnitude of voltage applied because reducing the magnitude of the voltage applied reduces the overshoot and oscillation of the rotor pole thereby reducing the adverse mechanical forces experienced by the gearing during electrical inching of the mill.

It will, of course, be apparent that the voltage applied to the stator must be sufficient to cause rotation, that is, there is a limit below which the voltage cannot be reduced.

In accordance with a broad aspect of the present invention there is provided an electric inching control means for inching a drive system comprising a load driven by one or more three phase synchronous motors. The inching control means includes: means for applying direct current excitation to the field winding on the rotors of the synchronous motors, means for applying direct current voltage to different phases of the stator windings of the synchronous motors in a predetermined sequence to rotate the rotors and the load by respective predetermined amounts upon each successive application of voltage to the different phases, and voltage magnitude control feedback means for controlling the magnitude of the voltage applied to the stator windings as a function of vibration due to adverse mechanical forces in the gearing of the drive system whereby the adverse mechanical forces are reduced.

In the preferred application for the inching control means, the load comprises a grinding mill, a ring gear attached to the mill, and pinions coupled in continuous meshing relation with the ring gear through clutches or couplings. The inching control means further includes, in the preferred embodiment, at least one vibrational sensing means such as a microphone, located in close proximity to the gearing so as to provide a signal representing the magnitude of sensed vibration for the voltage magnitude control feedback means, which signal is a function of adverse mechanical forces. In this embodiment, the signal reduces the magnitude of direct current voltage applied to the stator windings to reduce the vigour of rotor rotation and thereby reduce the vibration.

BRIEF DESCRIPTION OF THE DRAWING

For a better understanding of the nature and objects of the present invention reference may be had by way of example to the accompanying drawing, in which the single FIGURE is designated as FIG. 1 and in which there is illustrated a simplified schemmatic drawing showing the preferred embodiment of the present invention.

DETAILED DESCRIPTION

Referring to the FIGURE, there is illustrated a large ring gear 10 for a grinding mill (not shown). The ring gear 10 has attached thereto, in continuous meshing relation therewith, two pinions 12 and 14. While the teeth for ring gear 10 and pinions 12 and 14 are not illustrated in the drawing, it should be understood that it is the teeth of the ring gear 10 which are in meshing relation with the teeth of the pinions 12 and 14. Two shafts 16 and 18 respectively connect pinions 12 and 14 through fluid actuated clutches 20 and 22 to the shafts 24 and 26 of three phase synchronous motors 28 and 30. In the preferred construction, the working fluid for the clutches 20 and 22 is air provided to the clutches from air supply 32 via respective piping 34 and 36 through pressure valves 38 and 40.

In accordance with the present invention there is provided an inching control means generally indicated at 42. The inching control means is illustrated as including an actuating means or inching control 44 and a voltage magnitude controller 46. The inching control 44, in addition to locking the clutches by sending a signal along output line 48 to pressure valves 38 and 40, also energizes the synchronous motors 28 and 30. To energize the synchronous motors 28, 30, the inching control 44 applies a value of direct current voltage, which is cycled or stepped to approximate low frequency AC waveform, to the different phase windings of the stators of the synchronous motors 28, 30 over bus 50 and 52 to rotate the rotors and the load by respective predetermined amounts with each step of the applied voltage. A more detailed description can be found in the aforementioned reference "Spotting Equipment for Synchronous Motors". Connection of positive and negative direct current supply busses to various ones of the phases of the stator windings has been used for many years to spot or inch the rotors of sychronous motors. It is understood however, that prior to the inching of the synchronous motors 28 and 30, the motors are arranged in synchronism and the clutches 20 and 22 are fully engaged or locked, and the motor fields are energized by direct current field supply 31.

The electric inching control means 42 further includes a voltage magnitude controller 46. The voltage magnitude controller 46 decreases the magnitude of voltage applied by the inching control 44 as a function of the increase in detected vibration which represents adverse mechanical forces between the ring gear 10 and pinion 12, as will be explained, as the mill is rotated by the rotors of the synchronous motors 28 and 30.

The voltage magnitude controller 46 is shown as having connected thereto a sensing means in the form of transducer 54. Transducer 54, which is conviently a microphone with filters to reduce unwanted sounds, provides a feedback signal to inching control means 42 along line 56. Transducer 54 is shown to be located in proximity to the ring gear 10 and a respective one of the pinions (pinion 12). In this location, transducer 54 can sense the vibrations or impacts originating of the areas of engagement between the ring gear 10 and pinion 12 during angular stepping of the pinion.

An example of the rotor stepping process during synchronous motor inching is typically as follows:

Assuming a 48 pole 150 rpm synchronous motor, 28 and 30 in FIG. 1, and a typical 6 contractor stepping unit, 44, the magnitude of the discrete steps or advances executed by the rotor for each contractor pattern will be, $$\text{Mechanical degrees/step} = \frac{360 \text{ degrees} \times 2}{48 \text{ poles} \times 12 \text{ steps/cycle}}$$

$$= 1.25 \text{ degrees}.$$

The 6 contractor stepping unit referred to above is, for example, a unit such as is described in the aforementioned reference "Spotting Equipment for Synchronous Motors" about page 5 and the portion beginning on page 6 under "Description of Method" ending on page 8.

Although this angle of 1.25 degrees may appear to be a relatively small angle, those skilled in the drive design art will appreciate that should these impulses excite one of the natural resonant modes of oscillation of the motor, gear, and mill combination, gear stresses of a destructive magnitude may easily occur through the mechanism of torque amplification. By limiting the step-impact gear stresses by subject invention, the chances of gear damage are proportionally minimized.

While the foregoing has been a description of the preferred embodiment of the present invention, it should be understood that alternate embodiments may be readily apparent to one skilled in the art therefrom. Accordingly, the present invention should only be limited to that which is claimed in the accompanying claims.

What we claim as new and desire to secure by Letters Patent of the United States is:

1. An electric inching control means for inching a drive system comprising a load driven through gearing by two or more three phase synchronous motors coupled to said load through respective fluid actuated clutches once said clutches are locked-up and said synchronous motors are synchronized, each motor having a stator and a rotor, each stator having a three phase stator winding and each rotor having a field winding; said inching control means comprising: means for energizing said synchronous motors, including means for applying direct current excitation to said field winding on rotors of the synchronous motors and means for applying a stepped direct current voltage to the phases of said three phase stator winding of each of said synchronous motors, to rotate said rotors and said load by respective predetermined amounts with each stepped change of said voltage; and, voltage magnitude control feedback means for adjusting the magnitude of said voltage applied to the stator winding as a function of adverse mechanical forces incurred by said gear during rotation of said rotors and said load whereby said adverse mechanical forces are reduced.

2. An electric inching control means for inching a load, comprising:
   two or more three phase synchronous motors each having a stator and a rotor, each stator having a three phase stator winding and each rotor having a field winding,
   each said synchronous motor being coupled through a respective fluid actuated clutch to gearing means and said gearing means providing a common coupling to drive said load,
   means to initially position the rotors of said synchronous motors in a synchronized position and to actuate said clutches to a locked-up condition,
   a direct current supply connected to each said field winding to apply direct current excitation thereto,
   an inching voltage supply connected to said stator winding through switching means to provide direct current voltages to selected ones of the three phases of said stator windings in a sequence causing stepped rotation of said rotors,
   at least one vibrational sensing means positioned in close proximity to said gearing means for providing a signal whose magnitude is proportional to the sensed vibrations, and
   a voltage magnitude controller responsive to said signal to control the magnitude of said inching voltage supply to said stator windings in inverse relationship to the magnitude of said signal to reduce the vibration in said gearing means.

3. An electric inching control means as defined in claim 2 in which said vibrational sensing means is a microphone.

4. An electric inching control means for inching a load driven through gearing connected to fluid actuated clutches driven by at least two three-phase synchronous motors, the gearing comprising a ring gear connected to said load and a pinion gear connected with a respective clutch and engaging said ring gear, each said three phase motor having a stator with a three phase stator winding and a rotor having a field winding, said control means comprising
   means to initially position said rotors in a synchronized load sharing position and to actuate said clutches to a locked-up condition,
   a direct current supply connected to each said field winding to provide direct current excitation thereto,
   an inching voltage supply including a direct current supply with a positive and a negative bus, a pair of switches for each phase of the stator winding to connect the particular phase to the positive bus to the negative bus or to make no connection, and means to operate said switches to provide a direct current voltage connection to selected ones of said phases of said stator winding in a predetermined sequence to cause stepped rotation of said rotors,
   at least one vibrational sensing means positioned in close proximity to the region of engagement between said ring gear and at least one of said pinion gears for providing a signal whose magnitude is proportional to sensed vibrations, and
   a voltage magnitude controller responsive to said signal to control the magnitude of said inching voltage supply to said stator windings in inverse relationship to the magnitude of said signal, thereby to reduce said vibration.

* * * * *